(12) United States Patent
Verger et al.

(10) Patent No.: US 8,755,318 B2
(45) Date of Patent: Jun. 17, 2014

(54) SYNCHRONIZING UPLINK AND DOWNLINK TRANSMISSIONS IN A WIRELESS DEVICE

(75) Inventors: Luciano M. Verger, Santa Clara, CA (US); Gang Lu, Santa Clara, CA (US); Hyeonkuk Jeong, Saratoga, CA (US); Chris Y Chung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 13/604,572

(22) Filed: Sep. 5, 2012

(65) Prior Publication Data
US 2014/0064160 A1     Mar. 6, 2014

(51) Int. Cl.
| H04W 52/02 | (2009.01) |
| H04W 80/04 | (2009.01) |
| H04W 88/06 | (2009.01) |
| H04W 28/04 | (2009.01) |
| H04W 72/04 | (2009.01) |

(52) U.S. Cl.
USPC .......................................... 370/311; 370/329

(58) Field of Classification Search
CPC . H04W 52/02; H04W 52/0216; H04W 80/04; H04W 88/06; H04W 28/04; H04W 72/04
USPC .......................................... 370/311, 328, 329
See application file for complete search history.

(56) References Cited

U.S. PATENT DOCUMENTS

| 5,752,193 A * | 5/1998 | Scholefield et al. ....... 455/452.2 |
| 2008/0181127 A1 | 7/2008 | Terry et al. |
| 2008/0310396 A1 | 12/2008 | Park et al. |
| 2009/0239476 A1 | 9/2009 | Womack et al. |
| 2011/0141892 A1* | 6/2011 | Gong et al. .................... 370/235 |
| 2011/0158188 A1 | 6/2011 | Womack et al. |
| 2013/0223309 A1* | 8/2013 | Hsiao et al. .................... 370/311 |

OTHER PUBLICATIONS

Lei, Hongyan; "Performance Analysis of Power Management in WLAN and UMTS;" PhD Dissertation, North Carolina State University, Fall 2006, retrieved from <http://repository.lib.ncsu.edu/ir/bitstream/1840.16/5131/1/etd.pdf> on Jul. 3, 2013; Part 1—Cover pages, pp. i-x and 1-51.
Lei, Hongyan; "Performance Analysis of Power Management in WLAN and UMTS;" PhD Dissertation, North Carolina State University, Fall 2006, retrieved from <http://repository.lib.ncsu.edu/ir/bitstream/1840.16/5131/1/etd.pdf> on Jul. 3, 2013; Part 2—pp. 52-115.

* cited by examiner

*Primary Examiner* — Ronald Abelson
(74) *Attorney, Agent, or Firm* — Meyertons, Hood, Kivlin, Kowert & Goetzel, P.C.

(57) ABSTRACT

Synchronizing uplink and downlink transmissions by a wireless user equipment (UE) device. A connection with a network may be established via a wireless link with a cell. The UE may operate in an active state during first periods of time in which uplink or downlink communications may be performed between the UE and the network. The UE may operate in a reduced-power state during second periods of time in which uplink and downlink communications are not performed. The first periods of time may alternate with the second periods of time in a repeating manner. Uplink data generated by the UE may be buffered during second periods of time and transmitted during first periods of time. Buffering uplink data in this manner may prevent the UE from immediately transitioning from the reduced-power state to the active state to transmit uplink data, which may conserve battery of the UE.

26 Claims, 6 Drawing Sheets

SYNCHRONIZING UPLINK AND DOWNLINK TRANSMISSIONS IN A WIRELESS DEVICE

FIELD OF THE INVENTION

The present application relates to wireless devices, and more particularly to a system and method for a wireless device to synchronize uplink and downlink transmissions.

DESCRIPTION OF THE RELATED ART

Wireless communication systems are rapidly growing in usage. Further, wireless communication technology has evolved from voice-only communications to also include the transmission of data, such as Internet and multimedia content. Many wireless communication technologies, such as cellular communication technologies, are substantially designed to provide mobile communication capabilities to wireless devices, such as cellular phones. Accordingly, wireless devices are generally powered by a portable power supply, e.g., a battery.

Batteries hold a finite charge, and so in order to improve battery life of wireless devices, one approach is to reduce power consumption required to perform wireless communications. Accordingly, some wireless communication technologies implement features designed to conserve power while still providing a high-quality user experience. One example of such a feature is the capability to operate in a connected-mode with discontinuous reception (C-DRX) in LTE.

In C-DRX according to LTE, a wireless device may monitor the physical downlink control channel (PDCCH) at specific intervals, and enter a reduced-power state between those intervals if a sufficient period of inactivity is observed. While this may conserve power under some circumstances, the amount of power savings are highly dependent on traffic patterns, and it is possible that no savings will be realized at all if not enough continuous inactivity is observed. In particular, certain types of traffic patterns, such as bi-directional interactive and multimedia traffic, can negatively impact the length of periods of inactivity between traffic bursts, particularly if uplink and downlink bursts are offset from each other, which may reduce power savings or prevent a wireless device from entering a reduced-power state between bursts at all.

Furthermore, if a wireless device is forced, due to non-synchronous traffic patterns, into operating in a continuous active state, this may not only impact the battery life of the wireless device, but may also cause device temperature to escalate quickly. These problems are further aggravated in areas with low signal strength, such as cell edges, where high transmission power may be required. Accordingly, improvements in wireless communications would be desirable.

SUMMARY OF THE INVENTION

In light of the foregoing and other concerns, it would be desirable to provide a way for wireless devices to synchronize uplink and downlink transmissions, at least in some circumstances, e.g., in order to maximize periods of inactivity between traffic bursts, thereby potentially maximizing the amount of time spent in a reduced-power state without sacrificing throughput. In particular, it may be desirable to synchronize uplink and downlink transmissions for certain types of traffic types and/or patterns, such as traffic corresponding to bi-directional multimedia and/or interactive applications (e.g., video-chat applications, real-time interactive games, etc) which may involve repeated regular and/or frequent uplink and downlink bursts. Alternatively, or in addition, it may be desirable to synchronize uplink and downlink transmissions if certain ill-conditions are observed, which may be mitigated by synchronizing uplink and downlink transmissions, such as low battery life or thermal escalation.

Accordingly, embodiments are presented herein of a method for a wireless user equipment (UE) device to synchronize uplink and downlink transmissions, and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

Synchronizing uplink transmissions to downlink transmissions may be performed in a variety of ways, e.g., depending on the wireless communication technology. According to one set of embodiments, the UE may establish a connection with a network (e.g., a cellular service provider's network) via a wireless link with a base station. Downlink grants may be controlled by the base station, while uplink grants may be provided to the wireless device by the base station based on uplink scheduling requests by the UE. Accordingly, the UE may be capable of synchronizing uplink and downlink transmissions by transmitting uplink scheduling requests at approximately the same time as (e.g., just after, based on) receiving an indication of a downlink grant.

For example, if uplink data is generated by the UE while the UE is operating in a reduced-power state, or possibly even while the UE is operating in an active state if no downlink transmissions are being performed, rather than immediately transmitting an uplink scheduling request, the UE may buffer the uplink data. The UE may at some later time (e.g., once the UE has re-entered an active state) receive an indication of a downlink grant, and may transmit an uplink scheduling request (a request for an uplink grant, in order to transmit the buffered uplink data) based on the indication of the downlink grant. Downlink data may then be received during the downlink grant, while the uplink data may be transmitted during an uplink grant received in response to the uplink scheduling request. Because the uplink scheduling request may be synchronized to (e.g., transmitted in close succession to and/or in response to) reception of a downlink grant (e.g., the uplink scheduling request may be transmitted during reception of downlink data during the downlink grant), at least some of the downlink data may be received simultaneously with transmitting at least some of the uplink data.

Note that since buffering the uplink data in this way may effectively increase a latency or transmission delay of the uplink data, this method may not be appropriate for all types of application/service data. However, for many types of applications, a slight or very slight increase in latency caused by buffering uplink data in order to synchronize its transmission with reception of downlink data may be unnoticeable to the end-users. For example, delays on the order of milliseconds, tens of milliseconds, or possibly even up to hundreds of milliseconds may be unnoticeable for some video chat, gaming, or other applications, particularly if buffering/smoothing is also being performed by applications at an application layer (e.g., of the UE or another device with which the UE is communicating) which is using/presenting the data, according to some embodiments. Other applications may have higher or lower delay/latency tolerances, and so the method described herein may be more or less suitable for different applications.

Note also that it may be desirable to initiate an uplink transmission timer in conjunction with buffering the uplink data, in some embodiments. For example, if for some reason no downlink grant is received within a certain period of time, it may be desirable to transmit the uplink data in any case, e.g., to avoid overloading uplink data buffers, or in case the uplink data needs to be received prior to a next downlink transmission, or for any other of a variety of possible reasons. Such an uplink transmission timer may be initiated upon generating the uplink data, upon receiving the uplink data at a baseband layer for transmission, upon buffering the uplink data, or at another time, as desired, according to various embodiments.

Thus, by buffering uplink data until a downlink grant is received if a wireless device is in a reduced-power state (or possibly even if the wireless device is in an active state, if no downlink transmissions are being performed) instead of immediately transitioning to an active state to transmit the uplink data, the wireless device may be prevented from re-entering the active state for a period of time (e.g., until a downlink grant is received) and/or may more quickly transition from an active state to a reduced-power state, which may advantageously reduce battery consumption of the wireless device for the time period between generating/buffering the uplink data and receiving the downlink grant. Particularly when used in conjunction with suitable applications and combined with use of an uplink transmission timer or other failsafe technique to avoid ill conditions which could result from buffering uplink data in some circumstances, the method for synchronizing uplink and downlink transmissions presented herein may thus provide an excellent means of reducing battery consumption of a wireless device without significantly sacrificing data throughput or quality of user experience.

BRIEF DESCRIPTION OF THE DRAWINGS

A better understanding of the present subject matter can be obtained when the following detailed description is considered in conjunction with the following drawings.

Figure 1:
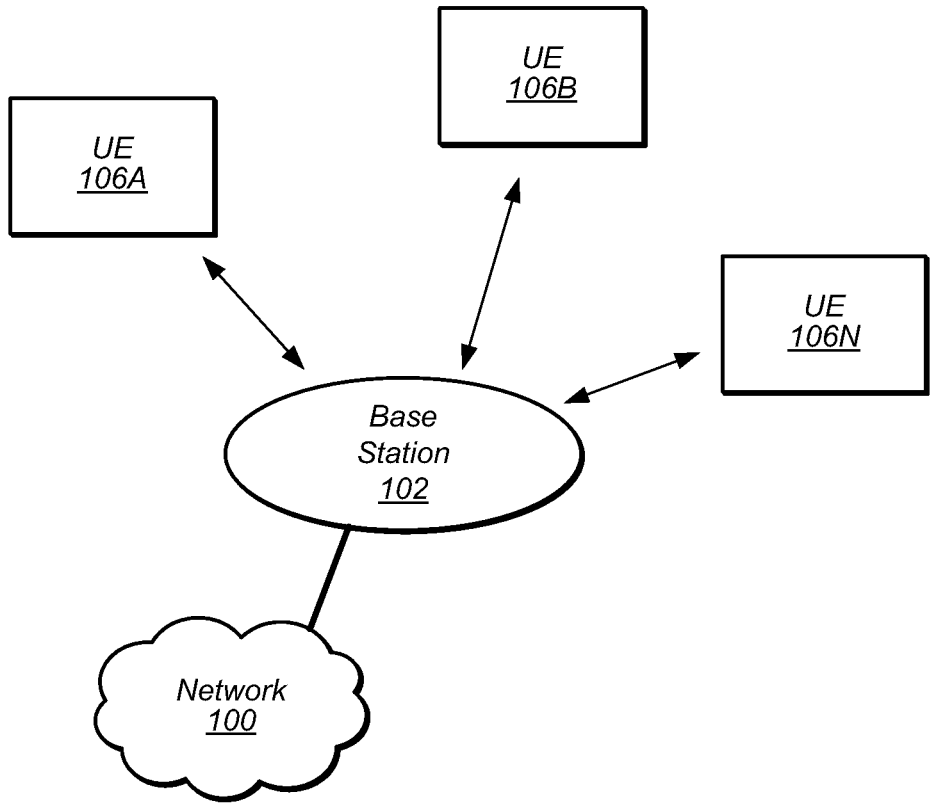
FIG. 1 illustrates an exemplary (and simplified) wireless communication system.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present patent application:
UE: User Equipment
BS: Base Station
GSM: Global System for Mobile Communication
UMTS: Universal Mobile Telecommunication System
LTE: Long Term Evolution
PDCCH: Physical Downlink Control Channel
PUCCH: Physical Uplink Control Channel
PDSCH: Physical Downlink Shared Channel
PUSCH: Physical Uplink Shared Channel Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
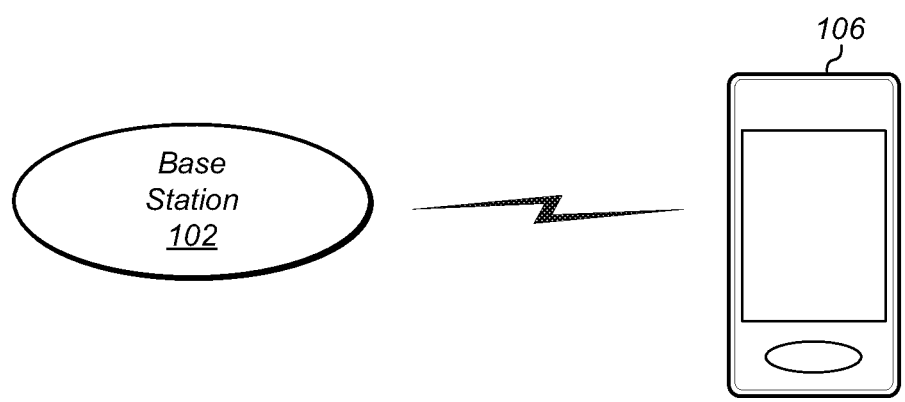
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

UE 106 may be capable of communicating using multiple wireless communication standards. For example, the UE 106 might be configured to communicate using two or more of GSM, UMTS, CDMA200, WiMAX, LTE, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of UMTS, CDMA 2000, LTE, WLAN, or GNSS. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or 1xRTT, and separate radios for communicating using each of Wi-Fi and Bluetooth. Other configurations are also possible.

The UE 106 may also be configured to synchronize uplink transmissions with downlink transmissions. In particular, according to some embodiments the UE 106 may support connected mode discontinuous reception (C-DRX) for data communications between the UE 106 and the BS 102, and may be configured to synchronize uplink transmissions with downlink transmissions in a manner adapted to maximize the amount of time that the UE 106 spends in a reduced-power state as part of C-DRX, such as further described hereinbelow.

Figure 3:
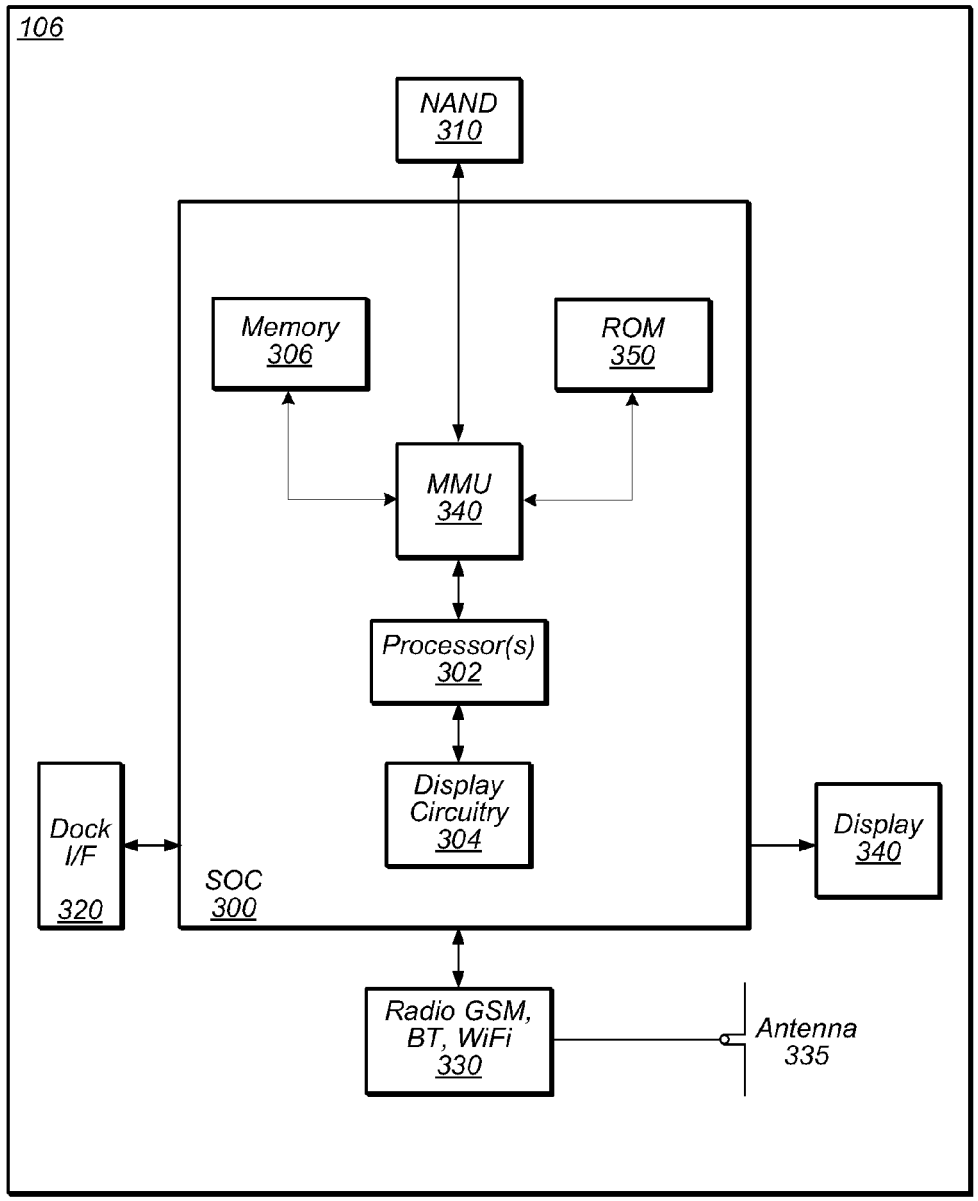
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for UMTS, LTE, CDMA2000, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

Figure 4:
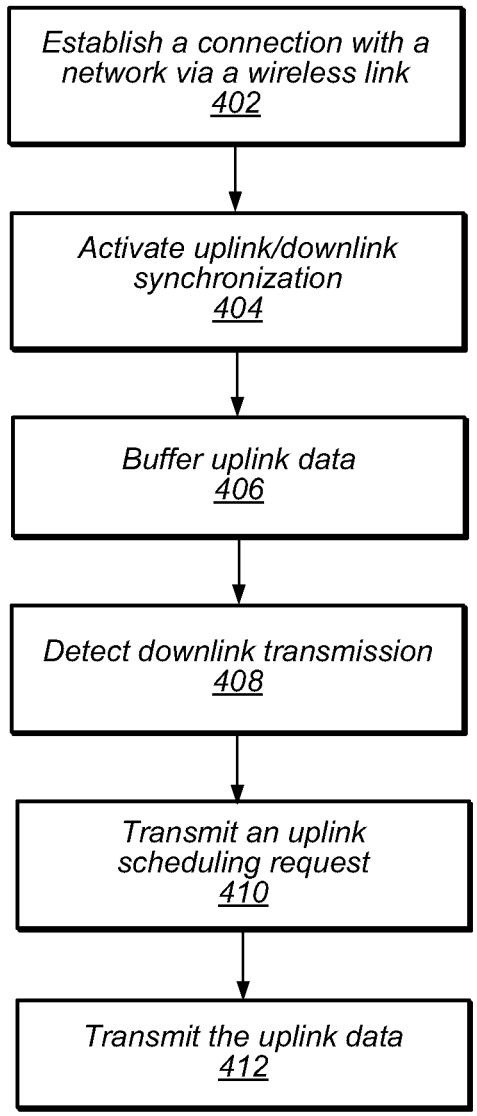
FIG. 4 is a flowchart diagram illustrating a method for a UE to synchronize uplink and downlink transmissions according to one embodiment.

As described herein, the UE 106 may include hardware and software components for implementing a method for synchronizing uplink and downlink transmissions according to embodiments of this disclosure. FIG. 4 and the description provided with respect thereto relate to one such method according to one set of embodiments.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

FIG. 4—Flowchart

FIG. 4 is a flowchart diagram illustrating a method for a UE device 106 to synchronize uplink and downlink transmissions. The method shown in FIG. 4 may be used in conjunction with any of the computer systems or devices shown in the above Figures, among other devices. For example, part or all of the method may be implemented by device logic of the UE 106, possibly in conjunction with a radio of the UE 106. In particular, part or all of the method may be implemented by baseband logic of the UE 106. The baseband logic may be configured to control operation of some or all radio components (which may be configured to operate according to one or more wireless communication protocols) included in the UE 106. The baseband logic (which may be implemented as a baseband software layer, as hardware logic, or a combination thereof, among various possibilities) may interact with other device components (e.g., higher software layers, such as application layers on which various applications executing on the UE 106 may operate). In various embodiments, some of the method elements shown may be performed concurrently, in a different order than shown, or may be omitted. Additional method elements may also be performed as desired. As shown, this method may operate as follows.

In 402, a connection with a network may be established via a wireless link, e.g., with a cell. The wireless link may operate according to any of various wireless technologies. In some embodiments, the wireless link may be a cellular link according to a cellular technology such as GSM, UMTS, LTE, CDMA2000 (1xRTT, 1xEV-DO), etc. The cell may accordingly be provided by a base station 102 and may provide a connection to the network, which may be a core network, e.g., of a cellular service provider, or any other network, as desired. According to some embodiments, the base station 102 may operate in conjunction with numerous other base stations (which may provide other cells) and other network hardware and software to provide continuous (or nearly continuous) overlapping wireless service over a wide geographic area.

The cell may serve the UE 106 and provide the connection to the network via the wireless link, and as such may act as the "serving" cell for the UE 106. There may also be one or more "neighboring" cells, provided by nearby base stations, with which the UE 106 may be capable of discovering, detecting signals from, and possibly communicating, but with which the UE 106 may not have an active wireless link.

Configuration information may be received from the cell and/or from the network as part of establishing the connection with the network. For example, as part of the process of attaching to the network (e.g., via the cell, or previously via another cell), the UE 106 may receive configuration information indicating various policies and procedures implemented by the network operator (e.g., the cellular service provider), according to which the UE 106 may be expected to operate.

The UE 106 (or certain components thereof, such as baseband layer components) may be configured to operate according to multiple possible modes of operation. For example, when a UE 106 is not actively exchanging data (e.g., as part of a call or a networking application such as a web browser) with the network, the UE 106 may typically operate in an idle mode, which may sometimes include "discontinuous reception" or "DRX" functionality. A UE 106 which supports idle-mode DRX may generally be inactive (e.g., with one or more components, such as radio and/or baseband components, powered down or sleeping) except for a window of activity during each DRX cycle. The active portion of a DRX cycle may be scheduled in a regular periodic manner; for example, many networks schedule the active portion of idle-mode DRX cycles to occur at 1.28 s intervals, or at some multiple of 1.28 s (e.g., 2.56 s, 5.12 s, etc). Other values for DRX periodicity may be used as desired.

During the active portion of an idle-mode DRX cycle, the UE 106 may perform certain actions according to the configuration of the UE 106 and/or according to configuration information received from the network. For example, the UE 106 may monitor a paging channel for incoming voice calls or data during the active portion of the idle-mode DRX cycle.

If it is determined that active data exchange is desired (e.g., for a voice call, a video chat application, a game, a networking/productivity application, or for any other application or service), the UE 106 may transition from the idle-mode to a connected-mode with the network. In the connected-mode, the UE 106 may establish data radio bearers in accordance with the wireless link with the cell, e.g., for exchanging control/signaling information and/or for transmitting uplink data and receiving downlink data. For example, according to an exemplary LTE set of embodiments, a UE 106 operating in connected-mode may be configured to communicate with the network via one or more of a physical downlink control channel (PDCCH) (e.g., for receiving control/signaling information), a physical uplink control channel (PUCCH) (e.g., for transmitting control/signaling information), a physical downlink shared channel (PDSCH) (e.g., for receiving certain data, such as application data), and a physical uplink shared channel (PUSCH) (e.g., for transmitting certain data, such as application data), among other possible communication channels.

In some embodiments, the UE 106 may further support a version of DRX in connected mode, which may be referred to as connected-mode discontinuous reception or C-DRX. For example, according to one set of embodiments, the UE 106 may be configured to perform data communications in a fully-active state (e.g., in which all communication-related device components are active). While in the active state, the UE 106 may monitor (e.g., via an inactivity timer or another means) activity/inactivity of data communications, and if a sufficient length of time passes in which no data communications are performed, the UE 106 may enter a reduced-power state (e.g., in which one or more communication-related device components, such as some or all radio and/or baseband logic components, are powered-down or enter a low power state, thereby reducing power consumption of the UE 106 relative to the active state) while remaining in connected-mode.

The UE 106 may be configured to re-enter the active state under certain conditions, e.g., in order to transmit uplink data and/or receive downlink data. For example, the UE 106 may re-enter the active state periodically (e.g., according to a schedule set by BS 102) to check whether downlink communications are desired (e.g., in which case an indication of a downlink grant may be received), or may re-enter the active state to transmit uplink data, e.g., in response to generation of uplink data by the UE 106 (e.g., by an application executing on the UE 106). In some embodiments, the UE 106 may periodically re-enter the active state to check whether downlink communications are desired, but may shortly thereafter again enter the reduced-power state without performing any data communications if no downlink (or uplink) communications are pending.

Thus, C-DRX may be similar to idle-mode DRX insofar as the UE 106 may alternate between an active state and a reduced power state when operating in C-DRX, but may also differ in certain ways. For example, data (e.g., application data) communications (e.g., via active data radio bearers) may be performed in the active state in C-DRX, whereas at least according to some embodiments, only indications that data communications are desired and other such control/signaling information may be communicated in the active state in idle-mode DRX. Other differences (e.g., shorter cycle lengths in C-DRX than in idle-mode DRX, etc.) and similarities are also possible depending on how the idle-mode DRX and connected-mode DRX are implemented, according to various embodiments. Further details of an exemplary implementation of a C-DRX feature according to one set of embodiments are also provided hereinbelow with respect to FIGS. 5-7.

Thus, at various times the UE may operate in an idle-mode (e.g., including idle-mode DRX operation) or in a connected-mode (e.g., including C-DRX operation) according to the connection established with the network via the wireless link in 402.

According to some embodiments, while the UE is operating in the connected mode, an indication or command to synchronize uplink transmissions with downlink transmissions may be received. The indication may be provided to the baseband logic/layer of the UE 106 by an application (e.g., executing at an application layer of the UE 106) according to some embodiments, or may be generated internally by the baseband logic/layer of the UE 106.

Synchronizing uplink and downlink transmissions (e.g., reducing or eliminating a temporal offset between uplink and downlink transmissions) may, at least in some situations, increase the amount of time that the UE 106 may spend in the reduced power state of C-DRX relative to the amount of time that the UE 106 spends in the active state, thereby improving battery power savings relative to C-DRX operation in which uplink and downlink transmissions are not synchronized. Synchronizing uplink and downlink transmissions may be particularly effective at reducing power consumption for specific types of traffic patterns, such as bi-directional repeating traffic (e.g., such as produced by multimedia interactive applications such as FaceTime or Skype) which may include regularly and/or frequently transmitted uplink bursts and received downlink bursts. For example, if the uplink and downlink bursts are offset from each other, this may reduce or eliminate any period of activity between bursts, thereby reducing or eliminating the length of time that the UE 106 may spend in the reduced-power state between bursts, while if the uplink and downlink bursts are synchronized with each other, this may maximize any period of activity between bursts, thereby maximizing the length of time that the UE 106 may spend in the reduced-power state between bursts.

It should be noted that, at least according to some embodiments, synchronization of uplink and downlink transmissions may be applied to data transmissions (e.g., transmissions of application data) but not to signaling (e.g., protocol-related) transmissions. For example, while many applications may not be significantly affected by slight delays in uplink bursts resulting from synchronizing uplink transmissions with downlink transmissions, delays in signaling transmissions (e.g., which might relate to handover between cells, communication channel setup, NAS-related communications, and/or any of various other protocol related functions) may have a detrimental affect on device performance, at least according to some embodiments.

The indication might be generated internally by the baseband logic in any of a variety of ways and for any of a variety of reasons. For example, according to one set of embodiments, the indication might be generated based on detecting that a condition has occurred, as a result of which it may be desirable to synchronize uplink transmissions with downlink transmissions. Such a condition might include the battery level of the UE falling below a battery level threshold, a temperature of the UE (or a portion of the UE) exceeding a thermal mitigation threshold, and/or detection of a type of traffic pattern (such as bi-directional repeating traffic) for which synchronizing uplink transmissions with downlink transmissions may be beneficial. Other conditions, and/or variations of the above-mentioned conditions, are also possible.

The indication might similarly be generated by another component of the UE 106 (or by the network or another device with which the UE 106 is in communication) and provided to the baseband logic in any of a variety of ways and for any of a variety of reasons. For example, the other component may detect one of the above-described conditions (or any other condition configured to act as a trigger to generate the indication to synchronize uplink transmissions with downlink transmissions), and may provide the indication through internal communication within the UE 106 or via wireless communication (e.g., from the network or another device with which the UE 106 is in communication). According to one set of embodiments, the indication may be generated by an application which generates a type of traffic (such as bi-directional repeating traffic) which is particularly suitable for synchronization of uplink transmissions with downlink transmissions, such as a video chat/call application. Alternatively, e.g., if the indication is generated internally by the baseband logic, an indication may be provided to one or more applications executing on the UE 106 that uplink transmissions are being synchronized with downlink transmissions. This may allow the application(s) to adjust their operation (e.g., adjust transmission rate/timing, bundle traffic in different burst sizes, and/or make other adjustments), if desired, based on the knowledge that uplink transmissions may be synchronized with downlink transmissions.

As a result of (e.g., in response to) the indication to synchronize uplink transmissions with downlink transmissions, the UE 106 (e.g., baseband logic executing in the UE 106) may synchronize uplink transmissions with downlink transmissions, e.g., in conjunction with C-DRX operation of the UE 106. According to some embodiments, synchronizing uplink transmissions with downlink transmissions while in connected-mode (e.g., in conjunction with C-DRX operation of the UE 106) may be performed by implementing steps 404-408 of the method, e.g., as subsequently described.

In 404, uplink data may be buffered (e.g., stored in a buffer). According to some embodiments, the uplink data may be buffered while the UE 106 is operating in a reduced-power state. For example, the uplink data may be buffered at a first time (e.g., during a first period of time) in which the UE 106 is operating in connected-mode in the reduced-power state as part of C-DRX operation. Alternatively, the uplink data may be buffered while the UE 106 is operating in an active state, but while no downlink transmissions are being performed, if desired.

The uplink data may be generated by an application executing (e.g., at an application layer) on the UE 106, according to some embodiments, and may be configured for transmission via the network. According to some embodiments, the uplink data may be generated as part of on-going bi-directional communication between the UE and another device (e.g., another UE, a desktop, laptop, netbook, tablet, or other type of computer system, or any of a variety of other types of device), via the network. For example, the uplink data may be multimedia and/or interactive data generated as part of a video chat/video call application, a real-time interactive game, or any of a variety of other types of applications that utilize bi-directional communication. Alternately, the uplink data may be any type of application data, if desired.

The uplink data may be received from the application and buffered as part of synchronizing uplink transmissions with downlink transmissions. The uplink data may be buffered because the UE 106 may be operating in the reduced-power state at the first time. Alternatively, the uplink data may be buffered because no downlink transmissions are occurring, even if the UE 106 is already in the active state, e.g., in order to avoid resetting the inactivity timer and thus in order to more quickly enter the reduced-power state. The uplink data may be buffered until a condition triggering transmission (or attempted transmission) of the buffered uplink data occurs.

At a second time (e.g., during a second period of time) the UE 106 may be operating in connected-mode in an active state as part of C-DRX operation. According to one set of embodiments, the UE 106 may have transitioned to the active state according to a scheduled wake-up time, e.g., in order to check for downlink grants. If an indication of a downlink grant is received at the second time, this may be one possible condition triggering transmission (or attempted transmission) of the buffered uplink data. If such an indication of a downlink is received during the second period of time, the UE 106 may also receive downlink data during the downlink grant indicated.

According to some embodiments, if no indication of a downlink grant is received when the UE 106 wakes up to check for downlink grants, the UE 106 may transition back to the reduced-powered state for a further period of time. The UE may thus continue to buffer the uplink data across a C-DRX cycle (e.g., over a transition from the reduced-power state to the active state and a transition back from the active state to the reduced-power state) without transmitting the uplink data under certain circumstances according to some embodiments. Alternatively, according to some embodiments a transition to the active state (e.g., to check for downlink grants) may be used as a condition triggering transmission (or attempted transmission) of the buffered uplink data even if no downlink grants are received, if desired.

As another possibility, according to one set of embodiments, the UE 106 may have transitioned to the active state at the second time based on an uplink transmission timer. For example, the uplink transmission timer may be a timer configured to avoid buffering uplink data for an excessive length of time, e.g., in case no downlink grants are received in a timely manner. The uplink transmission timer may thus be a timer initiated upon receiving (or buffering, or generating) the uplink data, whose expiration may also function as a condition which may trigger transmission (or attempted transmission) of the buffered uplink data (e.g., if no downlink grant or other such condition has already occurred), according to some embodiments. The uplink transmission timer may be configured to run for any length of time according to various embodiments, as desired.

In 406, an uplink scheduling request may be transmitted (e.g., via the wireless link) while the UE 106 is operating in an active state. The uplink scheduling request may be a request for an uplink grant, e.g., in order to transmit the buffered uplink data. In some embodiments, the uplink scheduling request may be transmitted at the second time, e.g., based on occurrence of a condition triggering transmission (or attempted transmission) of the buffered uplink data. For example, the uplink scheduling request may be transmitted in response to receiving an indication of a downlink grant, or in response to expiration of the uplink transmission timer.

In response to the uplink scheduling request, the UE 106 may receive (e.g., via the wireless link) an uplink grant. Note that if the uplink scheduling request is transmitted in response to receiving an indication of a downlink grant, transmission of the uplink scheduling request may overlap temporally with (e.g., may be performed at the same time as) receiving downlink data during the downlink grant.

In 408, the uplink data may be transmitted. The uplink data may be transmitted during the uplink grant. If the condition triggering transmission of the uplink data was reception of an indication of a downlink grant, transmission of the uplink data during the uplink grant may overlap temporally with reception of downlink data during the downlink grant, e.g., in addition to the uplink scheduling request, according to some embodiments.

Note that part or all of the above-described method may be performed in a repeating manner according to some embodiments. In particular, according to some embodiments, the UE 106 may cycle between periods of time in which the UE 106 operates in the reduced-power state and periods of time in which the UE 106 operates in the active state. During any (e.g., possibly including all) of the periods of time in which the UE 106 operates in the reduced-power state while the UE 106 is configured to synchronize uplink and downlink transmissions, uplink data generated by the UE 106 may be buffered, e.g., such as described hereinabove with respect to step 404, and transmitted during subsequent periods of time in which the UE 106 operates in the active state, e.g., such as described hereinabove with respect to steps 406 and 408.

According to some embodiments, such operation may continue until an indication to cease synchronizing uplink and downlink transmissions is received. For example, such an indication might be received as a result of cessation of a condition which initiated synchronization of uplink and downlink transmissions, such as termination of an application which features bi-directional repeating network traffic and/or initiation of an application which features a traffic patterns which are less well suited to synchronization of uplink and downlink transmissions (e.g., a web browser which typically performs one time web queries, or any other of a variety of possible applications).

Thus, by utilizing the method of FIG. 4 as provided above according to various embodiments, a UE 106 may advantageously synchronize uplink and downlink transmissions in order to maximize time in reduced-power state as part of C-DRX operation. In particular, storing the uplink data in the buffer until a downlink grant (or until another condition triggering transmission of the uplink data) is received may prevent the UE from re-entering the active state (e.g., until the downlink grant is received), which may reduce battery consumption for a time period between receiving the uplink data and receiving the downlink grant. The UE 106 may thereby conserve battery while still providing a high-quality user experience for at least certain types of applications and services.

Figure 5:
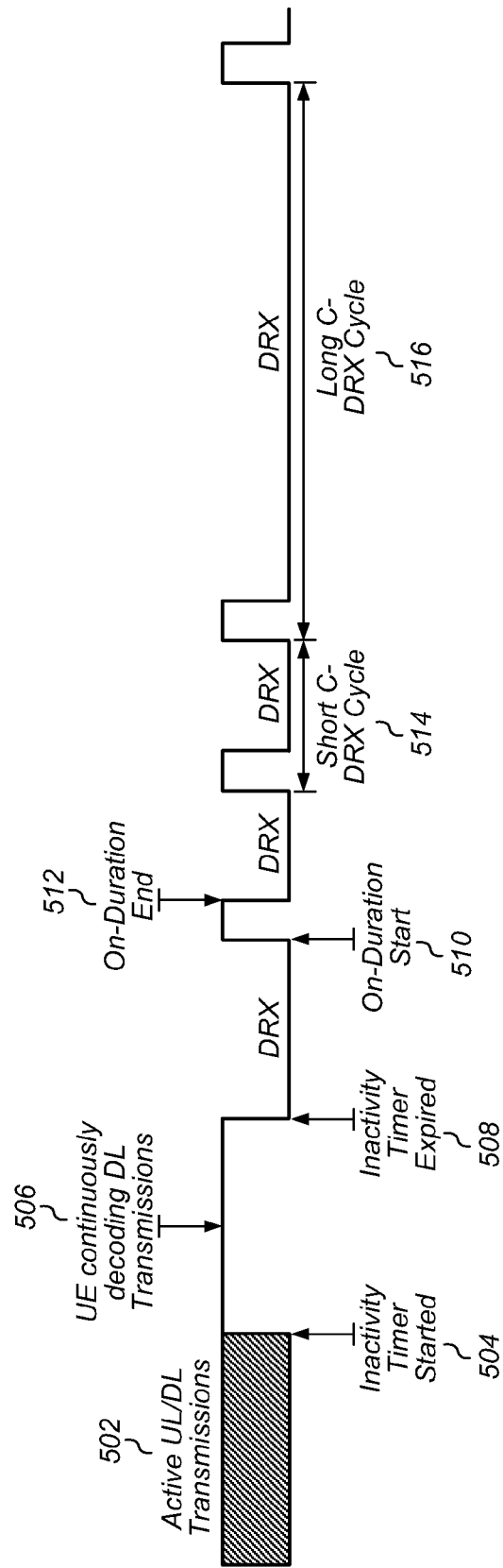
FIGS. 5-7 are timing diagrams illustrating operations of a C-DRX capable UE over a period of time according to several sets of embodiments.
Figure 6:
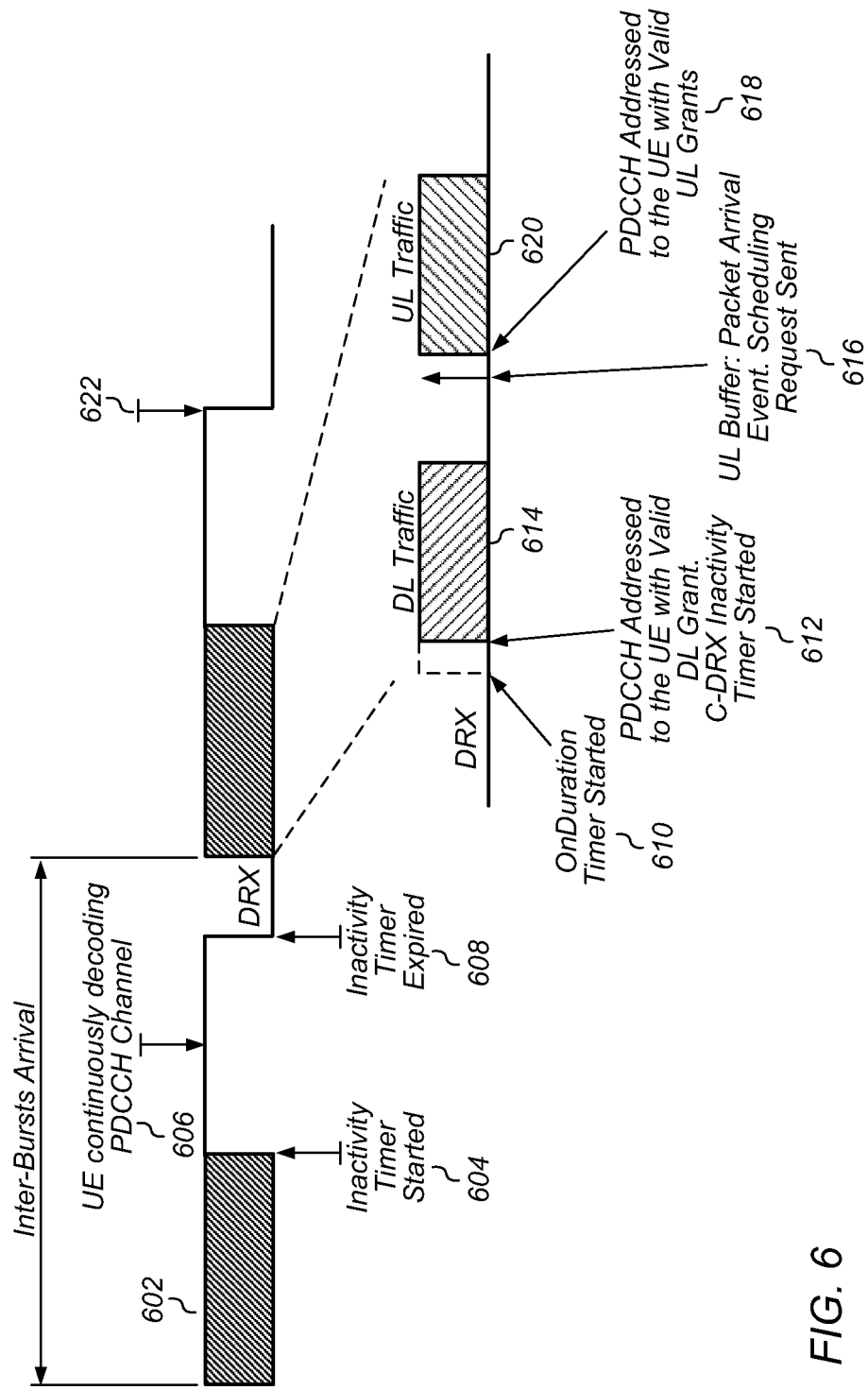
Figure 7:
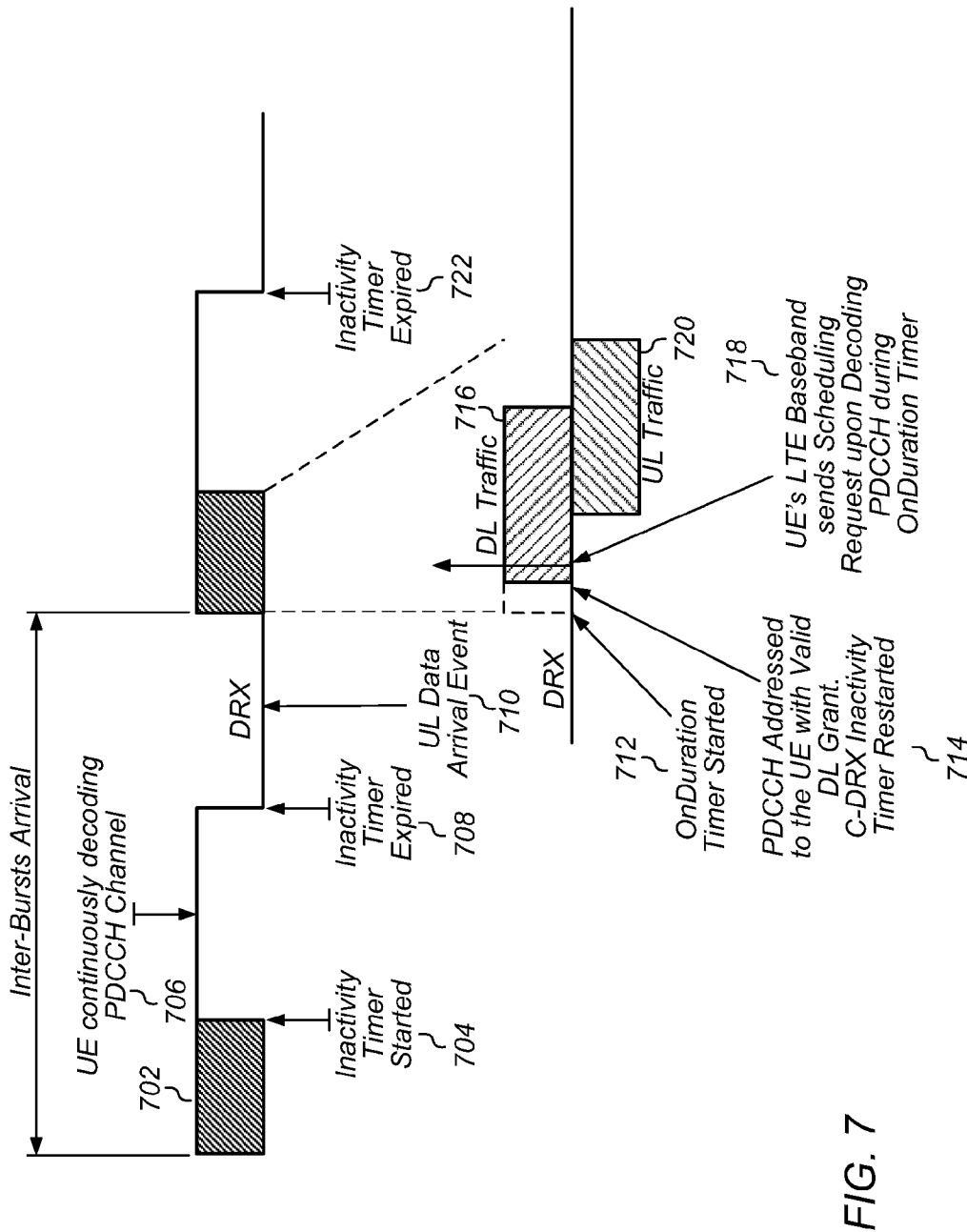

FIGS. 5-7—Exemplary C-DRX operation

FIGS. 5-7 are timing diagrams illustrating baseband operations of a UE 106 according various embodiments. In particular, the illustrated embodiments relate to an exemplary implementation in which the UE 106 is configured for wireless communication according to LTE, and supports C-DRX operations. While numerous specific details of the exemplary set of embodiments of FIGS. 5-7 are provided hereinbelow by way of example, it will be recognized by those of skill in the art that any number of variations on or alternatives to the specific details of the exemplary embodiments of FIGS. 5-7 may be implemented if desired, and that accordingly the description provided with respect thereto should not be considered limiting to the disclosure as a whole.

FIG. 5 illustrates various aspects of C-DRX operation generally. As shown, in 502, the UE 106 may operate in an active state and may perform one or more uplink and/or downlink transmissions (e.g., transmit uplink data and/or receive downlink data).

At 504, an inactivity timer may be initiated. The inactivity timer may be initiated at the end of the active transmissions in 502. Note that according to some embodiments, the inactivity timer may have been initiated one or more times during the active transmissions in 502, but may have been reset each time as a result of continuing activity (transmissions) until no more activity was observed at 504, at which point it may run until expiration at 508. The inactivity timer may have any length, as desired; some examples of possible inactivity timer length, according to some embodiments, might include 100 ms, 80 ms, 50 ms, 40 ms, or any other value.

In 506, between initiation (at 504) and expiration (at 508) of the inactivity timer, the UE 106 may not be performing any uplink or downlink transmissions, but may continue to operate in the active state, and may monitor one or more communication channels (e.g., a PDCCH) for downlink grants.

At 508, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 510, the UE 106 may "wake-up" and re-enter the active state. The UE 106 may wake up at a time specified by a schedule, e.g., of which it may be informed by a base station (e.g., an eNode-B, in LTE). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. According to some embodiments, one or more other functions may also be performed during this time, if desired. This time period may also be referred to as the "on-duration" in C-DRX operation, according to some embodiments. According to some embodiments, the on-duration may last a specified length of time, such as 10 ms, or 15 ms, or another length of time; alternatively, the on-duration may last until certain functions have been performed, and may end when no further specified functions need to be performed.

At 512, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that according to some embodiments, the UE 106 may also be configured to transition between C-DRX cycles with different lengths, according to some embodiments. For example, as shown, the UE 106 may perform up to a pre-determined number (such as 2, 4, 8, 16, etc.) of "short C-DRX" cycles 514 (which may last 20 ms, 40 ms, 80 ms, or any other length of time), and if no uplink or downlink transmission are performed by the end of the pre-determined number of cycles, the UE 106 may perform one or more "long C-DRX" cycles 516 (which may last 120 ms, 160 ms, 200 ms, or any other length of time), which may specify a longer period of reduced-power state operation before waking up for active state on-duration operations. The long C-DRX cycles may continue until further active communication (e.g., which may be initiated either by the UE 106 or the network) occurs, or one or more other conditions occur which might cause the UE 106 to transition away from the long C-DRX cycles.

If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

FIG. 6 illustrates aspects of C-DRX operation according to a set of embodiments in which regular bi-directional traffic is occurring (e.g., as part of an application configured for regular bi-directional traffic, such as a video chat/call application). For example, some video chat applications may transmit uplink bursts and receive downlink bursts at a regular frequency, such as every 40 ms, or every 50 ms, or every 60 ms, or at any other frequency. In the exemplary embodiment of FIG. 6, no attempt is made to synchronize uplink and downlink transmissions.

As shown, in 602 the UE 106 may perform uplink and/or downlink communications. In 604, an inactivity timer may be initiated, and in 606 the UE may remain active (e.g., decoding/monitoring a PDCCH channel) until expiration of the inactivity timer in 608. The UE may then transition to a reduced-power (DRX) state.

The UE may remain in the reduced-power state until the beginning of the next scheduled on-duration at 610. At 612, during the on-duration, the UE may decode a valid downlink grant (or grants) via the PDCCH channel. This may initiate the C-DRX inactivity timer, which may be reset as the downlink traffic is received (in 614) during the downlink grant and each time further traffic is communicated.

In 616, sometime after the downlink traffic has been completely received, uplink data (e.g., packet(s) configured for uplink transmission) may arrive, and the UE 106 may transmit an uplink scheduling request. Shortly thereafter (e.g., 4 ms, 2 ms, 6 ms, or any other length of time, according to various embodiments), in 618, the UE 106 may decode a valid uplink grant (or grants) via the PDCCH channel. The uplink data may be transmitted during the uplink grant in 620, after which the inactivity timer may run without being reset until expiration at 622.

FIG. 7 illustrates aspects of C-DRX operation according to a set of embodiments in which regular bi-directional traffic is occurring, much as in FIG. 6, but in which an attempt is made to synchronize uplink and downlink transmissions.

As shown, in 702 the UE 106 may perform uplink and/or downlink communications. In 704, an inactivity timer may be initiated, and in 706 the UE may remain active (e.g., decoding/monitoring a PDCCH channel) until expiration of the inactivity timer in 708. The UE may then transition to a reduced-power (DRX) state.

At 710, at some point while in the reduced-power state, uplink data (e.g., packet(s) configured for uplink transmission) may arrive (e.g., from an application executing on the UE 106, which may have generated the uplink data). However, rather than immediately transmitting an uplink scheduling request, the UE 106 may store the uplink data in a buffer and remain in the reduced-power state until the beginning of the next scheduled on-duration at 712. According to some embodiments, the UE 106 may also initiate an uplink transmission timer upon receiving and/or buffering the uplink data. The uplink transmission timer may be used as a fail-safe to ensure that the uplink data is transmitted in a timely manner even if no downlink grants are received within a timely manner. The uplink transmission timer may have any of a variety of values according to various embodiments, as desired; for example, the length of the uplink transmission timer might be 100 ms, 120 ms, 150 ms, or any other length of time.

At 714, during the on-duration, the UE may decode a valid downlink grant via the PDCCH channel. This may initiate the C-DRX inactivity timer, which may be reset as the downlink traffic is received (in 716) during the downlink grant and may continue to be reset as long as further traffic is communicated.

In 718, the UE 106 may transmit an uplink scheduling request. The UE 106 may transmit the uplink scheduling request in response to detecting (decoding) the valid downlink grant (and in response to receiving the uplink data at 710), and as illustrated, the uplink scheduling request may in some embodiments be transmitted during the same timeframe in which downlink traffic is being received (e.g., during the downlink grant 716). The UE 106 may receive an uplink grant (e.g., via the PDCCH channel) in response to the uplink scheduling request (also potentially during the downlink grant 716), and may transmit uplink data (e.g., packet(s) configured for uplink transmission) during the uplink grant, as shown in 720. As illustrated, the uplink grant 720 may also at least partially overlap temporally with the downlink grant 716. After completion of transmission of the uplink data in 720, the inactivity timer may be run without being reset until expiration at 722, at which point the UE 106 may again transition to the reduced-power (DRX) state until a next on-duration.

Note that according to some embodiments, if no downlink grant were received in the on-duration 712, the UE 106 might go back to sleep (re-enter the reduced-power state) without transmitting the uplink data. If at some later point the uplink transmission timer were to expire (e.g., depending on the length of the uplink transmission timer) while operating in the reduced-power state, the UE 106 might wake up (transition to the active state), transmit an uplink scheduling request, receive an uplink grant, and transmit the uplink data at that time in response to expiration of the uplink transmission timer. In this manner, the UE 106 may generally and preferably transmit uplink data in a synchronized manner with receiving downlink data, but may have a back-up trigger to avoid storing uplink data for an unduly long time before transmitting it in the event that no downlink transmission occur in a timely manner.

Thus, as illustrated, in the exemplary embodiment of FIG. 7, the portion of time during which the UE 106 may operate in the reduced-power state may be significantly longer than in the exemplary embodiment of FIG. 6, even though an equal amount of uplink and downlink data may be transmitted in each exemplary embodiment, and the amount of time between downlink burst arrivals (the "inter-burst arrival" time) may be the same in each exemplary embodiment. In other words, by synchronizing uplink transmissions to downlink transmissions as performed according to the exemplary embodiment of FIG. 7, the UE 106 may realize significant power savings compared the performing uplink and downlink transmissions in an un-synchronized manner, e.g., as might be performed according to the exemplary embodiment of FIG. 6, without sacrificing uplink or downlink throughput.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for baseband layer operation of a wireless user equipment (UE) device, the method comprising:
    establishing a connection with a network via a wireless link with a first cell;
    receiving uplink data from an application layer in the UE, wherein the uplink data comprises data to be transmitted to the network via the wireless link;
    storing the uplink data in a buffer;
    receiving a downlink grant via the wireless link;
    receiving downlink data via the wireless link during the downlink grant;
    transmitting an uplink scheduling request via the wireless link in response to receiving the uplink data and receiving the downlink grant;
    receiving an uplink grant via the wireless link in response to transmitting the uplink scheduling request;
    transmitting the buffered uplink data via the wireless link during the uplink grant;
    wherein the uplink data is received while the UE is in an inactive state as part of a discontinuous reception mode, wherein storing the uplink data in the buffer until the downlink grant is received prevents the UE from re-entering an active state until the downlink grant is received.

2. The method of claim 1,
    wherein the downlink grant overlaps temporally with the uplink scheduling request.

3. The method of claim 1, the method further comprising:
    receiving a command to synchronize uplink transmissions with downlink transmissions from an application layer in the UE;
    wherein the UE stores the uplink data in the buffer and waits until the downlink grant is received to transmit the uplink scheduling request in response to the command.

4. The method of claim 1, the method further comprising:
    detecting a condition, wherein the baseband layer is configured to synchronize uplink transmissions with downlink transmissions in response to detecting the condition;
    wherein the UE stores the uplink data in the buffer and waits until the downlink grant is received to transmit the uplink scheduling request in response to detecting the condition.

5. The method of claim 4, the method further comprising:
    sending an indication that the baseband layer is configured to synchronize uplink transmissions with downlink transmissions to the application layer in response to detecting the condition.

6. The method of claim 4, wherein the condition comprises one or more of:
    battery level of the UE falling below a battery level threshold;
    temperature exceeding a thermal mitigation threshold; or
    detecting that a type of traffic pattern is a bi-directional repeated transfer.

7. The method of claim 1, the method further comprising:
    initiating an uplink transmission timer in response to receiving the uplink data, wherein if the uplink transmission timer expires before the downlink grant is received, the uplink scheduling request is transmitted in response to expiration of the uplink transmission timer.

8. The method of claim 1, wherein the uplink data is received while the UE is in an inactive state as part of a discontinuous reception mode, wherein storing the uplink data in the buffer until the downlink grant is received prevents the UE from re-entering an active state until the downlink grant is received, thereby reducing battery consumption for a time period between receiving the uplink data and receiving the downlink grant.

9. A wireless user equipment (UE) device, the UE comprising:
    a radio, comprising one or more antennas for performing wireless communication;
    device logic, wherein the device logic is configured to:
        establish a connection with a network via a wireless link;
        communicate with the network via the wireless link using connected-mode discontinuous reception (C-DRX), wherein to use C-DRX the UE is configured to alternate between an active state in which communications are performed between the UE and the network and a reduced-power state in which communications are not performed between the UE and the network;
        receive an indication to synchronize uplink transmissions with downlink transmissions in conjunction with C-DRX operation;
        synchronize uplink transmissions with downlink transmissions in conjunction with C-DRX operation in response to the indication.

10. The UE of claim 9, wherein in order to synchronize uplink transmissions with downlink transmissions, the device logic is configured to:
    buffer uplink data generated by the UE while the UE is in the reduced-power state until the UE enters the active state.

11. The UE of claim 10, wherein the device logic is configured to:
    buffer uplink data generated by the UE during each of a plurality of occasions that the UE is in the reduced-power state.

12. The UE of claim 9, wherein in order to synchronize uplink transmissions with downlink transmissions, the device logic is configured to:
    buffer uplink data generated by the UE while the UE is in the reduced-power state until a downlink grant is received or an uplink transmission timer expires;
    transmit an uplink scheduling request to the network via the wireless link in response to receiving a downlink grant or determining that the uplink transmission timer has expired;

receive an uplink grant via the wireless link in response to transmitting the uplink scheduling request;

transmit the buffered uplink data via the wireless link during the uplink grant.

13. The UE of claim 12,
wherein the uplink transmission timer comprises a timer initiated upon receiving the uplink data generated by the UE.

14. The UE of claim 9,
wherein the device logic comprises baseband layer logic configured to control the radio.

15. The UE of claim 9,
wherein the device logic is configured to power down one or more components of the UE in the reduced-power state.

16. The UE of claim 15,
wherein the one or more components comprise one or more baseband logic components and/or one or more radio components.

17. A non-transitory computer-accessible memory medium comprising program instructions for a wireless user equipment (UE) device to communicate with a network via a wireless link, wherein the program instructions are executable to:

establish a connection with a network via a wireless link;

at a first time, wherein the UE is operating in a reduced-power state as part of a discontinuous reception mode at the first time:

buffer uplink data generated by the UE, wherein the uplink data is configured for transmission via the wireless link, wherein the uplink data is generated by the UE;

at a second time, wherein the UE is operating in an active state as apart of the discontinuous reception mode at the second time, wherein the second time occurs after the first time:

transmit a request for an uplink grant via the wireless link, wherein the request is for an uplink grant in which to transmit the buffered uplink data;

receive an indication of an uplink grant via the wireless link in response to the request for an uplink grant; and transmit the buffered uplink data via the wireless link during the uplink grant, wherein buffering the uplink data at the first time prevents the UE from operating in the active state at the first time.

18. The memory medium of claim 17, wherein the program instructions are further executable to, at the second time:

receive an indication of a downlink grant via the wireless link;

receive downlink data via the wireless link during the downlink grant;

wherein the program instructions are executable to transmit the request for the uplink grant in response to one or more of receiving the downlink grant or receiving downlink data during the downlink grant.

19. The memory medium of claim 18,
wherein the downlink grant overlaps temporally with one or more of transmitting the request for the uplink grant or the uplink grant.

20. The memory medium of claim 17, wherein the program instructions are further executable to:

determine that an uplink transmission timer has expired;

wherein the program instructions are executable to transmit the request for the uplink grant in response to determining that uplink transmission timer has expired.

21. The memory medium of claim 17, wherein the program instructions are further executable to:

receive an indication to synchronize uplink transmissions with downlink transmissions;

wherein buffering the uplink data generated by the UE at the first time is performed in response to the indication to synchronize uplink transmissions with downlink transmissions.

22. The memory medium of claim 21, wherein receiving the indication to synchronize uplink transmissions with downlink transmissions comprises one or more of:

detecting that battery level of the UE has fallen below a battery level threshold;

detecting that the UE has exceeded a thermal mitigation threshold;

detecting a type of traffic pattern predetermined to be appropriate for synchronization of uplink transmissions with downlink transmissions; or receiving an indication from an application to synchronize uplink transmissions with downlink transmissions, wherein the application generates the uplink data.

23. The memory medium of claim 17,
wherein the UE is configured to operate in the reduced-power state and the active state during alternating periods of time in a repeating manner;

wherein the program instructions are further executable to buffer uplink data generated by the UE during each of a plurality of periods of time in which the UE is operating in the reduced-power state.

24. A non-transitory computer-accessible memory medium comprising program instructions for a wireless user equipment (UE) device to communicate with a network via a wireless link, wherein the program instructions are executable to:

operate the UE in an active state during first periods of time in which uplink or downlink communications are performed between the UE and the network;

operate the UE in a reduced-power state during second periods of time in which uplink and downlink communications are not performed between the UE and the network, wherein the first periods of time alternate with the second periods of time in a repeating manner as part of connected-mode discontinuous reception (C-DRX) operation of the UE;

buffer uplink data generated by the UE during each of a plurality of second periods of time, wherein buffering the uplink data generated by the UE during each of the plurality of second periods of tome prevents the UE from operating in the active state during the second periods of time;

transmit buffered uplink data during each of a plurality of first periods of time.

25. The memory medium of claim 24, wherein the uplink data is generated by a bi-directional multimedia application executing on the UE, wherein the program instructions are further executable to:

determine that the uplink data is generated by the bi-directional multimedia application executing on the UE;

wherein the program instructions are executable to buffer the uplink data while operating in the reduced-power state and transmit the uplink data while operating in the active state in response to determining that the uplink data is generated by the bi-directional multimedia application executing on the UE.

26. The memory medium of claim 24,
wherein buffering uplink data generated by the UE during each of the plurality of second periods of time prevents the UE from immediately transitioning to the active state to transmit the uplink data.

* * * * *